United States Patent
Zhang et al.

(10) Patent No.: US 7,277,962 B2
(45) Date of Patent: Oct. 2, 2007

(54) METHOD AND APPARATUS FOR PACKET SCHEDULING USING VIRTUAL TIME STAMP FOR HIGH CAPACITY COMBINED INPUT AND OUTPUT QUEUED SWITCHING SYSTEM

(75) Inventors: Zhi-Li Zhang, Minneapolis, MN (US); Yiwei Thomas Hou, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 10/011,604

(22) Filed: Dec. 3, 2001

(65) Prior Publication Data

US 2002/0129158 A1  Sep. 12, 2002

Related U.S. Application Data

(63) Continuation of application No. 60/250,458, filed on Dec. 1, 2000.

(51) Int. Cl.
*G06F 15/173* (2006.01)
*H04L 12/56* (2006.01)

(52) U.S. Cl. .................... 709/240; 370/395.42

(58) Field of Classification Search ............... 709/238, 709/240, 230; 370/395.42, 395.4
See application file for complete search history.

(56) References Cited

U.S. PATENT DOCUMENTS

| | | | |
|---|---|---|---|
| 5,930,259 A * | 7/1999 | Katsube et al. | 370/409 |
| 6,173,325 B1 * | 1/2001 | Kukreja | 709/224 |
| 6,247,058 B1 * | 6/2001 | Miller et al. | 709/234 |
| 6,247,061 B1 * | 6/2001 | Douceur et al. | 709/240 |
| 6,493,120 B1 * | 12/2002 | Tancevski | 398/47 |
| 6,735,219 B1 * | 5/2004 | Clauberg | 370/474 |
| 6,741,552 B1 * | 5/2004 | McCrosky et al. | 370/218 |
| 6,775,289 B1 * | 8/2004 | Charny | 370/395.4 |
| 6,859,842 B1 * | 2/2005 | Nakamichi et al. | 709/238 |
| 6,914,883 B2 * | 7/2005 | Dharanikota | 370/230.1 |

(Continued)

OTHER PUBLICATIONS

Chuang et al., "Matching output queueing with a combined input/output-queued switch", IEEE Journal on Selected Areas in Communications, vol. 17, Issue 6, Jun. 1999, pp. 1030-1039.*

(Continued)

*Primary Examiner*—Andrew Caldwell
*Assistant Examiner*—Douglas Blair
(74) *Attorney, Agent, or Firm*—Christie, Parker & Hale, LLP

(57) ABSTRACT

A method and apparatus for packet scheduling using a virtual time stamp for a high capacity combined input and output queued switching system. A network employs a virtual time reference system (VTRS) to generate packet virtual time stamps associated with each packet traversing the network. The VTRS includes edge conditioners located at the edge of the network that receive unregulated packet traffic and generate regulated packet traffic for a given flow. The edge conditioners also add a packet virtual time stamp to each incoming packet. Core routers within a network core reference the packet virtual time stamps to schedule packet flow. The core routers also update the packet virtual time stamps using virtual delays. The packet virtual time stamps are removed from the packets when the packets leave the network core through an edge conditioner.

26 Claims, 6 Drawing Sheets

U.S. PATENT DOCUMENTS 6,920,112 B1 * 7/2005 McCloghrie et al. ....... 370/252
6,931,025 B1 * 8/2005 Masuda ...................... 370/466
6,977,945 B1 * 12/2005 Noda et al. ................. 370/468
7,088,725 B1 * 8/2006 Kato ..................... 370/395.64

OTHER PUBLICATIONS

Prabhakar et al., "On the speedup required for combined input output queued switching", IEEE International Symposium on Information Theory, Aug. 1998, p. 165.*

* cited by examiner

METHOD AND APPARATUS FOR PACKET SCHEDULING USING VIRTUAL TIME STAMP FOR HIGH CAPACITY COMBINED INPUT AND OUTPUT QUEUED SWITCHING SYSTEM

CROSS-REFERENCE TO RELATED APPLICATION

This application claims the benefit of U.S. Provisional Application No. 60/250,458 filed on Dec. 1, 2000 which is hereby incorporated by reference as if set forth in full herein.

BACKGROUND OF THE INVENTION

The problem of Quality of Service (QoS) provisioning in packet-switched networks has been a focus of networking and telecommunication research communities. Many new packet scheduling algorithms, such as Virtual Clock (VC) and Weighted Fair Queueing (WFQ), have been proposed for the support of QoS guarantees. For example, it has been shown that in a network where WFQ schedulers (or VC schedulers) are employed at every router, end-to-end delay and bandwidth guarantees can be supported for each user traffic flow. Using these results as a reference model, the Internet Engineering Task Force (IETF) has defined a guaranteed service under its Integrated Services or IntServ architecture, where end-to-end delay and bandwidth guarantees are provided for users on a per-flow basis. To support the IETF IntServ architecture, a signaling protocol, RSVP, for setting up end-to-end QoS reservation along a flow's path has also been proposed and standardized.

Performing per-flow management inside the network, however, raises the important issue of scalability. Because of the complexity of per-flow operations both in the data plane and QoS control plane, the IntServ architecture may not scale well with the increasing size of the Internet. As an alternative to per-flow based QoS provisioning, in recent years a different paradigm, the Differentiated Services or DiffServ, has been proposed and defined by the IETF. By processing packets based on a number of pre-specified Per-Hop Behaviors (PHBs) encoded by bit patterns carried inside a packet header, the DiffServ paradigm greatly simplifies the data plane of the network core of a domain, thereby making it more scalable. (We will refer to these bit patterns, or the PHBs they embody, as the packet state.) End-to-end, user-to-user QoS support is provided through intra-domain QoS provisioning and inter-domain service agreement. These control plane functions can be performed, for example, by employing a bandwidth broker architecture. On the other hand, the DiffServ architecture, as it is currently defined, aims to provide only coarse-grain QoS support to users. It remains to be seen whether such a service model would be sufficient to meet the potentially diverse user QoS requirements in the future. Furthermore, many issues regarding the design of bandwidth brokers such as admission control and QoS provisioning still need to be addressed, both theoretically and in practice.

The DiffServ paradigm has been extended using the notion of dynamic packet states to include several techniques to support end-to-end per-flow delay guarantees without per-flow QoS management. In the data plane, a (non-work-conserving) scheduling algorithm, called Core Jitter Virtual Clock or CJVC, provides end-to-end per-flow delay guarantees without per-flow scheduling states at core routers. (Such scheduling algorithms are referred to as core-stateless, in contrast to the conventional stateful scheduling algorithms such as VC or WFQ, where certain scheduling states must be maintained for each flow.) In the control plane, an aggregate reservation estimation algorithm is designed which eliminates the need of maintaining per-flow QoS reservation states. Instead, an aggregate QoS reservation state is maintained at each core router. A hop-by-hop signaling protocol, however, is still needed to set up QoS reservation for each flow along its path within a domain.

The Internet backbone is facing two problems simultaneously: (1) there is a need to introduce guaranteed QoS, and (2) there is a need for faster switching infrastructure. The first problem may be solved by building switches using output-queuing. This approach is known to achieve the throughput of the switch to 100%. Furthermore, powerful scheduling algorithms, for example WFQ, may be placed at the output port and thus provide QoS guarantee. But output queuing for an N×N switch may require the switching fabric and memory to run N times as fast as the line rate. Thus it may be impractical to design high speed switches, for example a terabit switch, since memories with sufficient bandwidth are simply not available at such high speed.

To build faster switches, an Input-Queued (IQ) switch architecture may be employed since the fabric and memory of an IQ switch need only run as fast as the line rate. Furthermore, it has been shown that by using a scheme known as Virtual Output Queuing (VOQ), it is possible to eliminate entirely the so-called Head-Of-Line (HOL) blocking problem associated with an IQ switch. However, it remains to be seen how an IQ switch without any speedup can guarantee QoS.

It is possible to use a combined input and output port queued (CIOQ) switch with a small speedup, termed S, (e.g., 2-4) to provide guaranteed QoS. Under such an architecture, buffers are employed at both the input ports and output ports and the switch can remove up to S ($1\_<S<\_N$) packets from each input and deliver up to S packets to each output within a time slot, where a time slot is the time between packet arrival at input ports. With a small speedup, for example, 2 to 4 time, a CIOQ switch may behave identically to an OQ switch for all types of traffic. Herein, "behave identically" is defined as when the same inputs are applied to both the OQ switch and to the CIOQ switch, the corresponding output processes from the two switches are completely indistinguishable.

Although there are processes that enable a CIOQ switch with a small speedup to mimic an OQ switch with WFQ scheduling algorithm, in practice, such processes may not be implementable for the following two problems: the processes are not scalable (and thus not feasible) to maintain per-flow QoS state in a high speed CIOQ switch to mimic an OQ switch with WFQ scheduler; and even if it were feasible to maintain per-flow state at the CIOQ switch, the calculation of departure time for scheduling in a CIOQ switch requires complex communication among various input and output ports, which is simply not implementable for a switch operating at very high speed. Therefore, there is a need to design an implementation-friendly scheduling algorithm for a CIOQ switch to guarantee QoS.

SUMMARY OF THE INVENTION

A method and apparatus for packet scheduling using a virtual time stamp for a high capacity combined input and output queued switching system are provided. A network employs a virtual time reference system (VTRS) to generate packet virtual time stamps associated with each packet traversing the network. The VTRS includes edge conditioners located at the edge of the network that receive unregulated packet traffic and generate regulated packet traffic for a given flow. The edge conditioners also add the packet virtual time stamp to each incoming packet. Core routers within a network core reference the packet virtual time stamps to schedule packet flow. The core routers also update the packet virtual time stamps using virtual delays. The packet virtual time stamps are removed from the packets when the packets leave the network core through an edge conditioner.

In one aspect of the invention, a method for routing packets by a scheduler operably coupled to a switch including a plurality of inputs and a plurality of outputs is provided. A packet virtual time stamp is generated for each of the packets and appended to the packets upon entering the network. The switch included in the network receives at its plurality of inputs the packets and the scheduler matches inputs to outputs using the packet virtual time stamps.

In another aspect of the invention, the scheduler a matches the plurality of inputs to the plurality of outputs by determining a virtual finish time for each packet in the regulated packet traffic and matching an output to an input using the virtual finish times.

In another aspect of the invention, the network further includes an edge conditioner located at the edge of the network. The edge conditioner is operably coupled to a first-hop core router in the network core. The edge conditioner receives the packets and generates a regulated packet traffic for a flow using the a size of each of the packets and a reserved flow rate. The regulated packet traffic is transmitted by the edge conditioner to the first-hop core router.

In another aspect of the invention, the first-hop core router updates the packet virtual time stamp for each packet in the regulated packet traffic for a flow using the arrival time of each packet at the first-hop core router. Subsequent network core routers update the packet virtual time stamp for each packet in the regulated packet traffic for a flow using each packet's packet virtual time stamp and a virtual delay. For delay-based network core routers, the virtual delay is a fixed delay. For rate-based network core routers, virtual delay is generated using the size of each packet, a flow rate reserved for the regulated packet traffic for a flow, and a cumulative queuing delay

BRIEF DESCRIPTION OF THE DRAWINGS

These and other features, aspects, and advantages of the present invention will become better understood with regard to the following description and accompanying drawings where.

DETAILED DESCRIPTION

A Virtual Time Reference System (VTRS) in accordance with an embodiment of the present invention provides a unifying scheduling framework allowing scalable support for guaranteed services using the DiffServ paradigm. An embodiment of a scheduler based on the VTRS for a switch resolves both a scaling problem associated with maintaining per-flow QoS state information at a switch and a complex inter-port communication problem encountered in calculating and updating a departure time for each packet associated with the switch. More specifically, a virtual finish time associated with each incoming packet to a switch provides for scheduling in a switch to mimic a Core Stateless Virtual Clock (CSVC).

Figure 1:
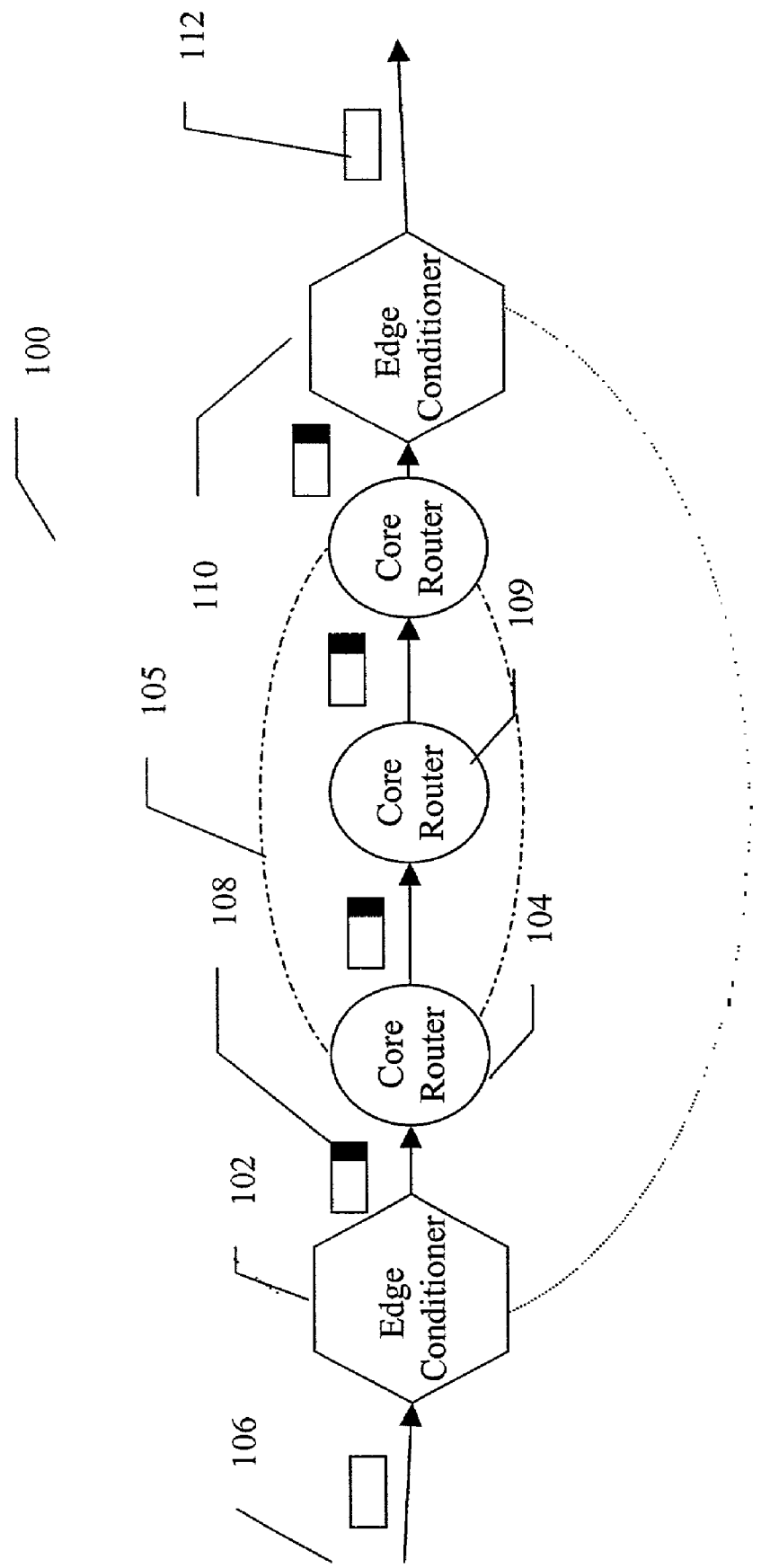
FIG. 1 is a diagram of an exemplary computer network in accordance with the present invention.

FIG. 1 is a diagram of an exemplary embodiment of a network employing a VTRS in accordance with the present invention. A computer network 100 employing a VTRS includes an edge conditioner 102 located at the edge of the computer network. The edge conditioner is operably coupled to a core router 104 included in a network core 105. The edge router receives an incoming packet 106 that is to be transmitted through the network. The edge conditioner receives the incoming packet and generates a VTRS packet 108 by associating a packet state including a packet virtual time stamp to the incoming packet. The VTRS packet is transmitted to the core router. The core router uses the packet virtual time stamp included in the VTRS packet's packet state to schedule the transmission of the VTRS packet to the next core router 109 in the network core.

Each core router in the network core uses the packet virtual time stamp to schedule the transmission of the VTRS packet to the next core router. Additionally, each core router receiving the VTRS packet updates the packet virtual time stamp as the VTRS packet leaves the core router. A final edge conditioner 110 receives the VTRS packet and generates an outgoing packet 112 by removing the packet virtual time stamp from the VTRS packet. Thus, the VTRS is defined and implemented within a single administrative domain because the packet virtual time stamp inserted by one administrative domain will not be carried over to another administrative domain.

The exemplary embodiment of a network in accordance with the present invention is shown with three core routers and two edge conditioners with a single path through the network. Other embodiments of networks in accordance with the present invention may employ a plurality of edge conditioners each of which may be coupled to a plurality of core routers. In turn, each core router may be operably coupled to a plurality of other core routers in the network core.

Figure 2:
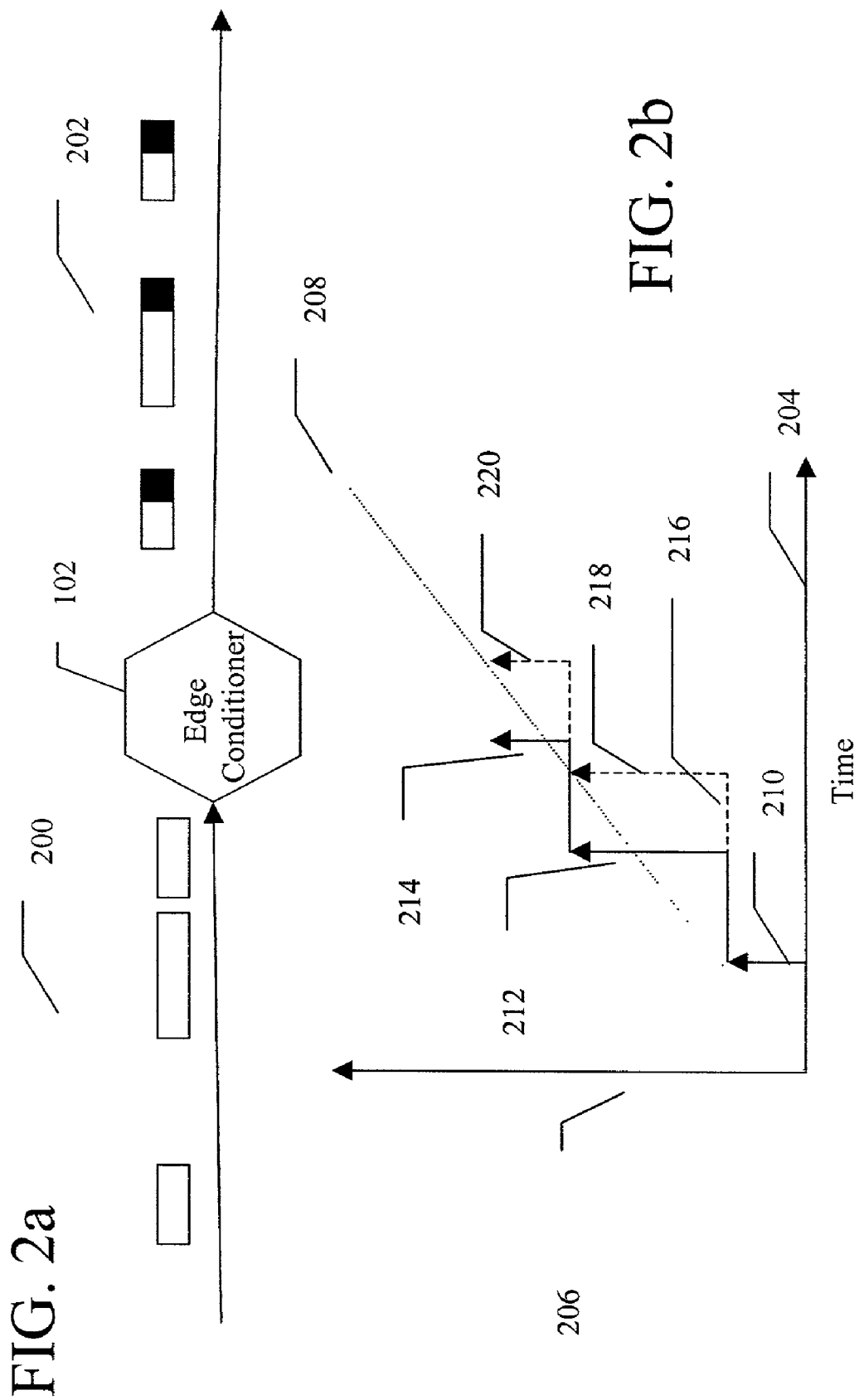
FIG. 2a is a diagram of an exemplary traffic spacer in accordance with the present invention.
FIG. 2b is a diagram depicting the effect edge traffic conditioning has on the flow of traffic injected into a core network.

FIG. 2a is a diagram of an exemplary embodiment of an edge conditioner in accordance with the present invention. An exemplary embodiment of an edge conditioner 102 receives a flow of packets 200. The edge conditioner injects the traffic of a flow into the network core at a rate less than or equal to the flow's reserved rate. The edge conditioner uses a rate spacing process that generates appropriate spacing between the packets of a flow based on the flow's reserved rate. The resulting packet traffic 202 is regulated and includes in each VTRS packet a packet state including a packet virtual time stamp. The edge conditioner generates packet traffic wherein the arrival times of the packets within the network core adhere to the following relationship: for a flow j with a reserved rate $r^j$, the inter-arrival time of two consecutive packets of the flow is such that:

$$a^{j,k+1} - a^{j,k} \geq L^{j,k+1}/r^j \quad (1)$$

where $a^{j,k}$ denotes the arrival time of the kth packet, $p^{j,k}$, of flow j at the network core, and $L^{j,k}$ is the size of packet $p^{j,k}$.

In the VTRS, each core router is equipped with a per-hop virtual time reference/update mechanism allowing maintenance of a continual progression of the virtual time embodied by the packet virtual time stamps. As a VTRS packet traverses each core router along the path of the VTRS packet's flow, the packet virtual time stamp is updated by the core router as the VTRS packet leaves the core router. This packet virtual time stamp represents the arrival time of the packet at the next core router in virtual time, and thus it is also referred to as the virtual arrival time of the packet at the next core router. With respect to the virtual time, the inter-arrival time spacing is preserved at a core router by the VTRS packet spacing generated by the edge conditioner. Or to put it another way, the "virtual rate" (as defined with respect to the virtual time) of packets of a flow arriving at a core router does not exceed the reserved rate of the flow.

FIG. 2b is a graph depicting the effect edge traffic conditioning has on the flow of traffic injected into a network core. Increasing time is represented on the horizontal axis and cumulative traffic in a flow is represented on the vertical axis 206. For a given reserve rate over time, the expected cumulative traffic in a flow is given by the service curve 208. A first unregulated packet 210 may arrive at the edge conditioner and be injected into the core network without exceeding the service curve. A second unregulated packet 212 may arrive at the edge conditioner. Injection of the second unregulated packet may cause the flow's cumulative traffic to exceed the service curve for the flow. A subsequent unregulated packet 214 may arrive at the edge conditioner and be injected into the network core. The result is that the reserved rate of the flow may be exceeded.

In a regulated flow, a delay 216 is added to the second unregulated packet so that a regulated packet 218 is injected into the network core that does not exceed the service curve of the flow. In a like manner, a delay is added to each subsequent unregulated packet to generate a subsequent regulated packet 220. Thus the edge conditioner generates a flow of packets wherein the inter-packet delay satisfies equation 1.

Figure 3:
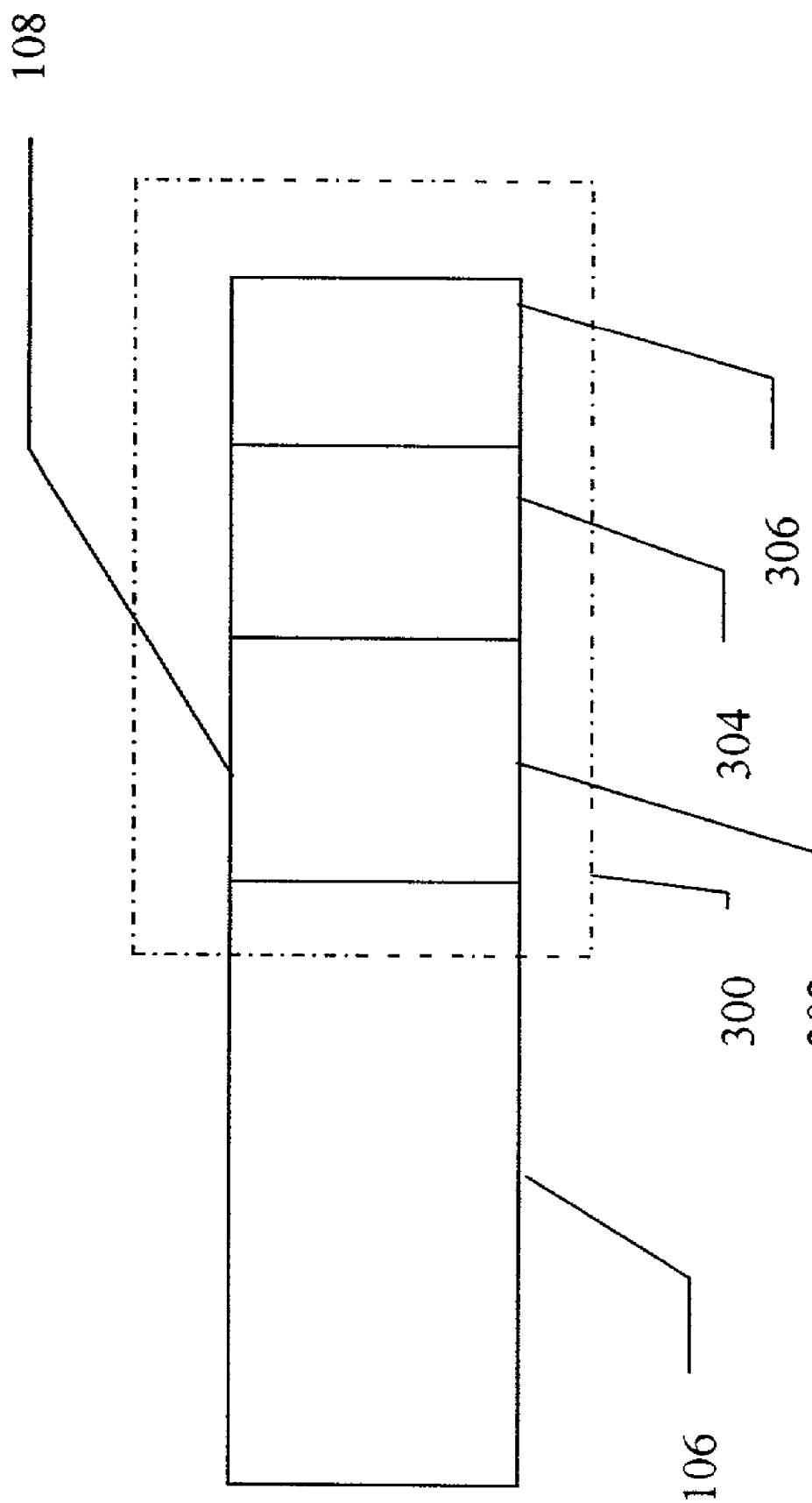
FIG. 3 is a diagram of a packet with a packet virtual time stamp in accordance with the present invention.

FIG. 3 is a diagram of a packet with a packet state in accordance with the present invention. Core routers in a network core employing a VTRS reference and update a packet state included in each VTRS packet transmitted through the network. A VTRS packet 108 includes an incoming packet 106 and a packet state 300. The packet state includes QoS reservation information 302 for the flow including the VTRS packet. The QoS information includes a reserved flow rate or a delay parameter for the flow. The VTRS packet further includes a packet virtual time stamp 304 for the VTRS packet and a virtual time adjustment term 306. The packet state is initialized and appended to a packet at the network edge after the packet has gone through the edge conditioner. The per-hop behavior of each core router is defined with respect to the packet state carried by VTRS packets traversing the core router. One property of packet virtual time stamps is that they can be computed using the packet state carried by packets (plus a couple of fixed parameters associated with core routers). In this sense, the VTRS is core stateless, as per-flow states are not needed at core routers for computing packet virtual time stamps.

Figure 4:
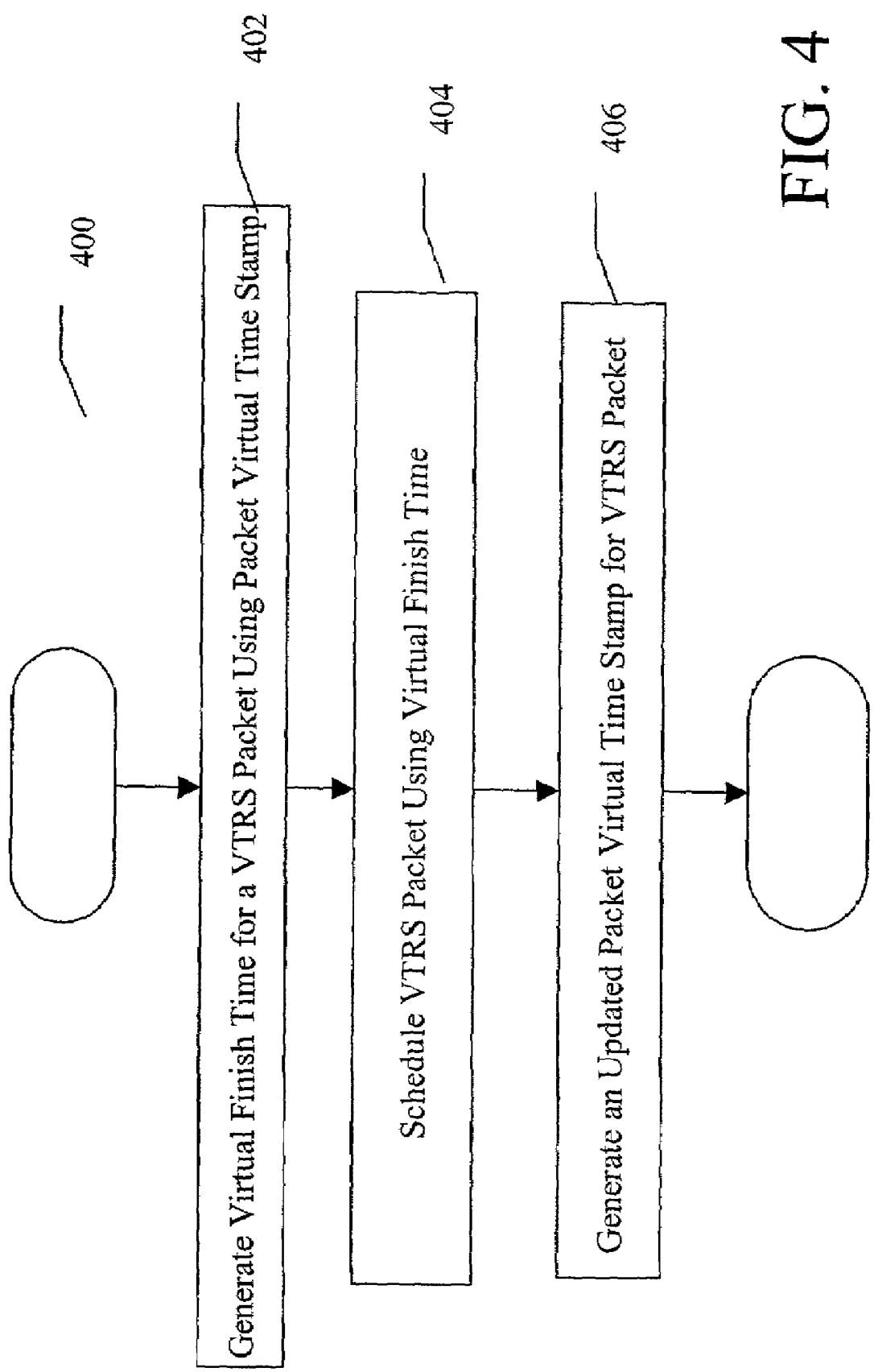
FIG. 4 is a process diagram of an exemplary virtual stamp update process as used by a core router in accordance with the present invention.

FIG. 4 is a process diagram of an exemplary virtual time stamp update process as used by a core router in accordance with the present invention. Each core router in the network core references and updates the packet virtual time stamp. A core router uses 402 a packet virtual time stamp for a VTRS packet to generate a virtual finish time for the VTRS packet's traversal of the core router. The core router uses 404 the virtual finish time to schedule the departure of a VTRS packet from the core router. The core router updates 406 the packet virtual time stamp before the VTRS packet is transmitted to the next core router.

The packet virtual time stamp as used by a core router is updated by the previous core router. In the case where the core router is the first-hop core router, the packet virtual time stamp is initialized to the actual arrival time of the VTRS packet to the first-hop core router. If the first-hop core router is located with an edge conditioner, then the actual arrival time of the VTRS packet is substantially the same as the actual network arrival time of the packet used to generate the VTRS packet. If the core router is not the first-hop core router, the packet virtual time stamp is updated by adding a delay value to the previous packet virtual time stamp.

In one embodiment of a VTRS in accordance with the present invention, the delay value added to a packet virtual time stamp by a core router includes a virtual delay. The virtual delay is determined by the type of the core router. Core routers can be either rate-based routers or delay-based routers. A rate-based router has a service capacity equal to the reserved rate $r^j$ of flow j. Hence a rate-based router takes $L^{j,k}/r^j$ amount of time to process packet $p^{j,k}$ of flow j. A delay-based router has a fixed latency, which equals a delay parameter $d^j$ of flow j. In other words, a delay-based router with latency $d^j$ takes $d^j$ amount of time to process a VTRS packet included in flow j, independently of the VTRS packet's packet size.

For a rate-based router, the virtual delay is given by $L^{j,k}/r^j$ added to a virtual time adjustment term, $\delta^{j,k}$. In a network having q rate-based core routers, $\delta^{j,k} = \Delta_q^{j,k}/q$ where $\Delta_q^{j,k}$ is the cumulative queuing delay of VTRS packet $p^{j,k}$. The virtual time adjustment term is generated at the network edge and inserted into the packet state in addition to the reserved rate $r^j$ as shown in FIG. 3.

In one embodiment of a VTRS in accordance with the present invention, the delay value added to a packet virtual time stamp by the core routers includes a propagation delay value, $\pi$. The propagation delay is the delay experienced by a VTRS packet as the VTRS packet is transmitted between routers in a network core. The propagation delay can be predetermined for each hop, is independent of the size of the VTRS packet being transmitted, and stored by the router as a fixed parameter.

In one embodiment of a VTRS in accordance with the present invention, the delay value added to a packet virtual time stamp by a core router includes an error term, $\Psi$. The error term is an upper bound of the difference between the actual departure time and virtual finish time of a packet traversing a core router.

In one embodiment of a VTRS in accordance with the present invention, the delay value added to a packet virtual time stamp by a core router is the summation of the virtual delay, the error term, and the propagation delay, or:

$$\varpi_{i+1}^{j,k} = \varpi_i^{j,k} + \tilde{d}_i^{j,k} + \Psi_i + \pi_{i,i+1}$$

where $\varpi_{i+1}^{j,k}$ is the virtual time stamp for VTRS packet $p^{j,k}$ entering the $(i+1)^{th}$ hop router $S_{i+1}$, $\tilde{d}_i^{j,k}$ is the virtual delay for hop router Si, $\Psi_i$ is the error term for hop router Si, and $\pi_{i,i-1}$ is the propagation delay between hop router Si and Si+1.

A Core stateless Virtual Clock (CsVC) scheduler is a work-conserving, rate-based scheduler using a packet virtual time stamp. A CsVC scheduler services VTRS packets in the order of their virtual finish times. For any packet $p^{j,k}$ traversing the scheduler, if $\omega^{j,k}$ is the virtual time carried by $p^{j,k}$ as it enters the scheduler, and $$d^{j,k} = \frac{L^{j,k}}{r^j} + \delta^{j,k}$$

its virtual delay. Then the virtual finish time $v^{j,k}$ of $p^{j,k}$ is given by $\omega^{j,k}+d^{j,k}$.

A virtual time earliest deadline first (VT-EDF) scheduler is a work-conserving, delay-based scheduler. A VT-EDF scheduler services VTRS packets in the order of their virtual finish times. The virtual finish time of $p^{j,k}$ is given by $V^{p,k}=\omega^{j,k}+d^j$, where $\omega^{j,k}$ is the virtual time carried by $p^{j,k}$ as it enters the VT-EDF scheduler and $d^j$ is the delay parameter associated with the VTRS packet's flow.

Figure 5:
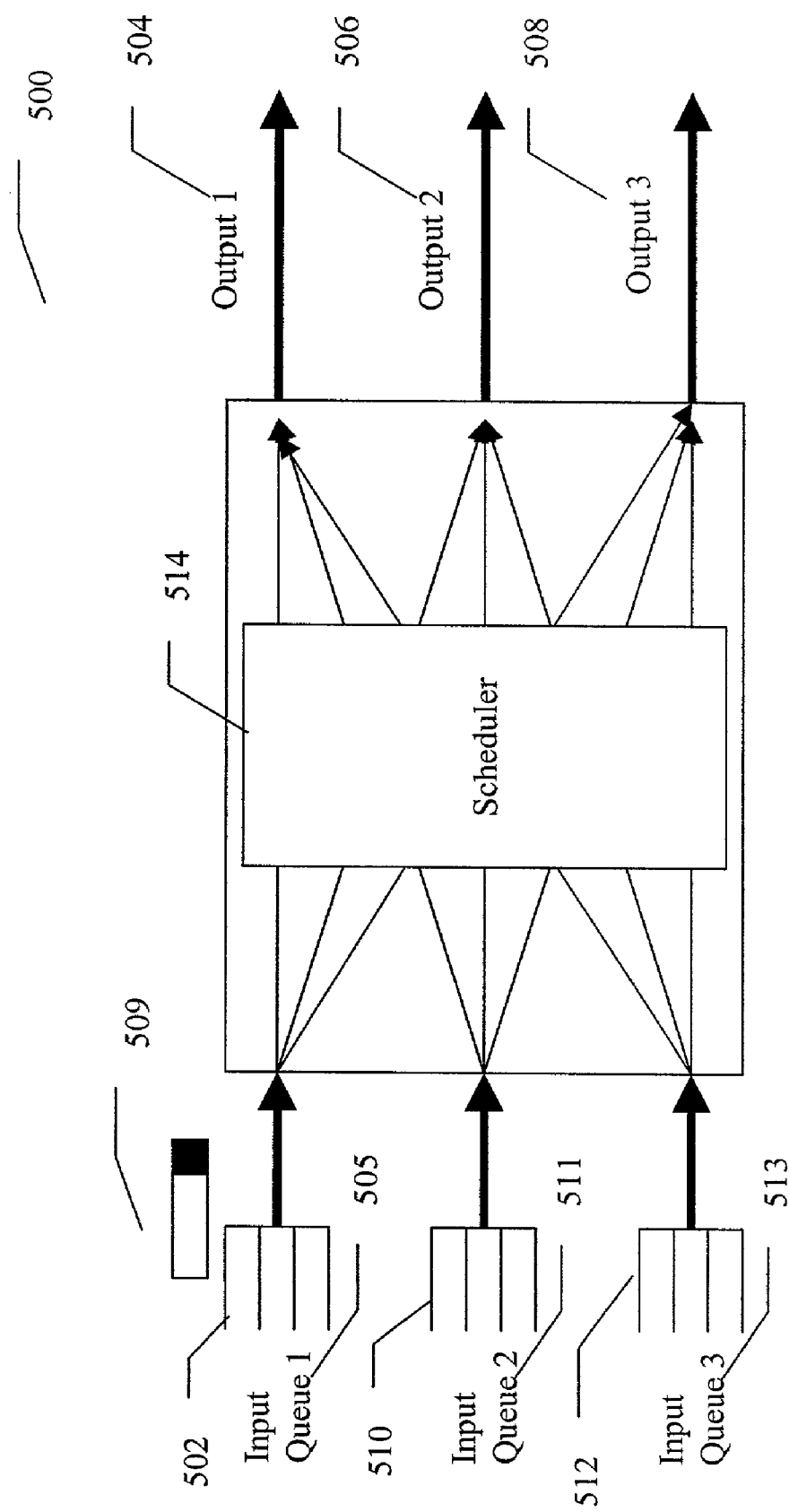
FIG. 5 is a diagram of an exemplary 3×3 switch in accordance with the present invention.

FIG. 5 is a diagram of an exemplary 3×3 CIOQ switch in accordance with the present invention. An exemplary 3×3 CIOQ switch 500 includes a first input port 502 operably coupled to a first output port 504, a second output port 506, and a third output port 508. The first input port is operably coupled to a set of Virtual Output Queues (VOQ) 505 for packets destined for each output. The set of VOQs includes a separate queue corresponding to each of the output ports. Incoming VTRS packets are stored in a VOQ in sorted order based on the VTRS packet's virtual finish times. In an embodiment of a CIOQ switch in accordance with the present invention, the VTRS packets are sorted in ascending order with the VTRS packet with the smallest virtual finish time at the front of the queue.

In a similar manner, a second input port 510 is operably coupled to the first, second, and third output ports. The second input port is operably coupled to a second set of VOQs 511 for packets destined for each output. A third input port 512 is operably coupled to the first, second, and third outputs. The third input port is operably coupled to a second set of VOQs 513 for packets destined for each output.

A scheduler 514 generates a matching between the inputs and the outputs in such a way that each non-empty input is matched with at most one output and, conversely, each output is matched with at most one input. The matching is used to configure the CIOQ switch before packets are transferred from the input side to the output side. The scheduler uses the previously described virtual finish time to match inputs and outputs. The scheduler matches inputs to outputs by assigning an output to an input holding the output's VTRS packet with the smallest virtual finish time. In the case of contention caused by multiple outputs being matched to a single input, the scheduler breaks the contention and matches one of the outputs to the single input. The scheduler will try and match a losing output to an input holding the losing output's VTRS packet with the next smallest virtual finish time. When no more matching of inputs and outputs is possible, VTRS packets are transferred and the scheduler repeats the process.

Figure 6:
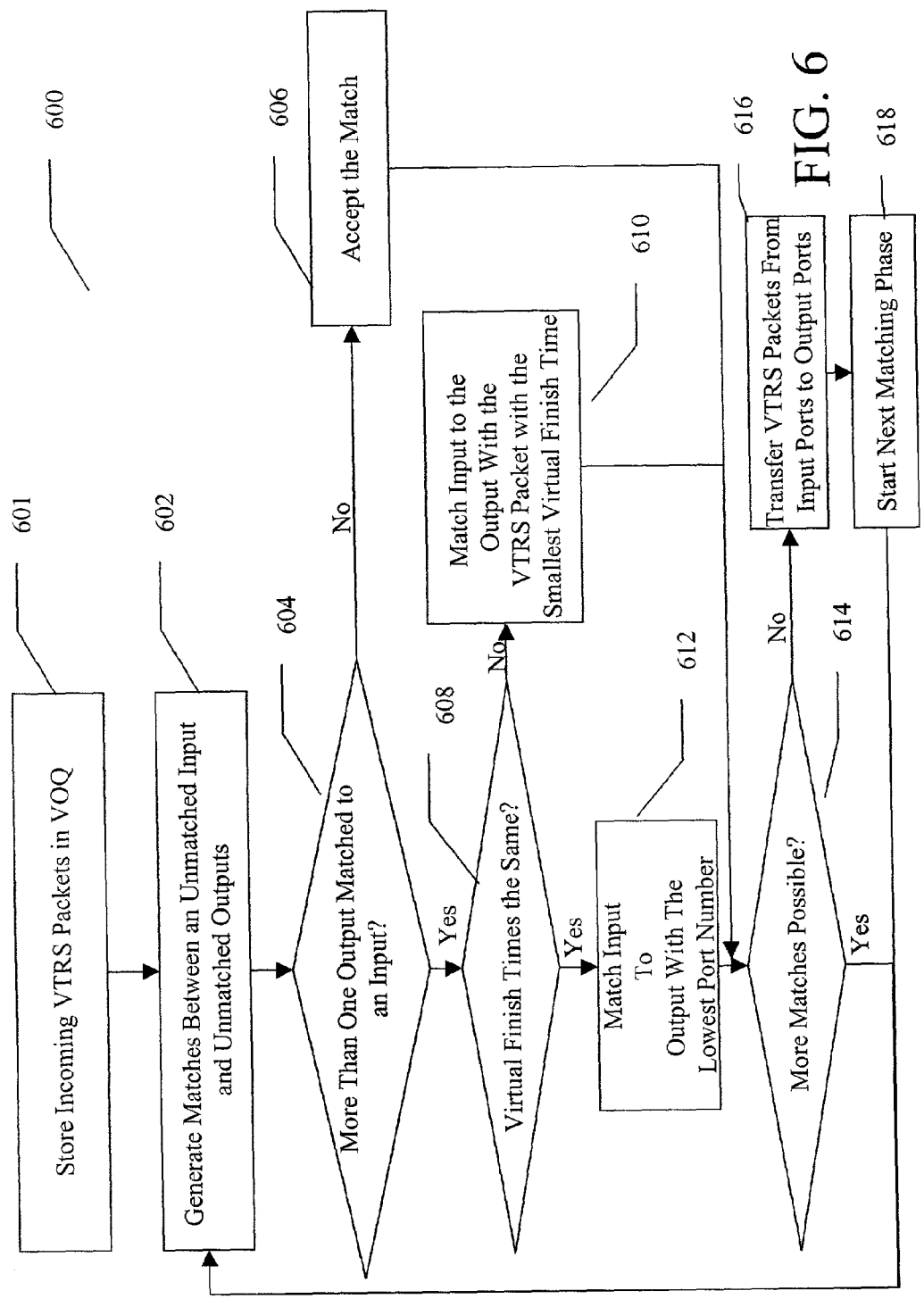
FIG. 6 is a diagram of an exemplary smallest virtual finish time first scheduling process in accordance with the present invention.

FIG. 6 is a diagram of an exemplary smallest virtual finish time first scheduling process in accordance with the present invention. At the beginning of each transfer phase, each output port tries to obtain its VTRS packet with the smallest virtual finish time from an input port. Incoming packets are stored 601 in the VOQs for each input port as previously described. At the beginning of each phase, a scheduler tentatively matches 602 each unmatched output port to an input port. An input port is matched to an output port if the input port is holding the VTRS packet in a VOQ for the output port having the smallest virtual finish time.

The scheduler determines if more than one output port is tentatively matched to the same input port 604. If only one output port is matched to an input port, then the scheduler accepts 606 the match. If more than one output port is matched to an input port the scheduler determines 608 if the virtual finish times for the VTRS packets for the output ports are the same. If the virtual finish times for the VTRS packets are the same, then the scheduler matches 610 the input port to the output port with the smallest port number. If the virtual finish times for the VTRS packets are not the same, the scheduler matches 612 the input port to the output port whose VTRS packet has the smallest virtual finish time. The scheduler repeats 614 the process of matching unmatched input ports to output ports until there are no more matches possible. Once all possible matches are made, the scheduler transfers 616 the VTRS packets from the input ports to the matched output ports. The scheduler then starts 616 a new matching phase.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by claims supported by this application and the claims' equivalents rather than the foregoing description.

What is claimed is:

1. A method for scheduling packets in a network, the network having routers including core routers and edge conditioners, the packets entering the network at the edge conditioners providing inputs to the network and leaving the network at the edge conditioners providing outputs from the network, the method comprising:

generating a packet state including a virtual time stamp for each of the packets, comprising initializing the virtual time stamp for each of the packets to an arrival time of each of the packets at an initial router at which the packet enters the network, adding a virtual delay and a propagation delay to the virtual time stamp, the virtual delay comprising an amount of time to process each packet and the propagation delay indicating a transmission time between the routers;

associating the packet states with the packets to obtain virtual time reference system (VTRS) packets;

at each core router receiving a VTRS packet, scheduling transmission of the VTRS packet to a next core router by using the virtual time stamp;

updating the virtual time stamp at the core router as the VTRS packet leaves the core router; and removing the virtual time stamp from the VTRS packets at the edge conditioners providing the outputs from the network.

2. The method of claim 1 further comprising generating regulated packet traffic for a flow using the VTRS packets.

3. The method of claim 2, wherein generating regulated packet traffic further includes using a size of each VTRS packet and a reserved flow rate.

4. The method of claim 1 wherein the virtual delay further comprises an error term, the error term indicative of an upper bound of a difference between an actual departure time and a virtual finish time of the VTRS packet traversing the core router.

5. The method of claim 1, wherein the amount of time to process each packet is generated using the size of each packet and a flow rate reserved for a flow including each packet.

6. The method of claim 5, wherein the packet state further includes the reserved flow rate and a virtual time adjustment term.

7. The method of claim 1, wherein each core router includes a switch having a plurality of switch inputs and a plurality of switch outputs, the method further comprising:
matching the VTRS packets to the switch outputs using the packet states, wherein matching the VTRS packets to the switch outputs further includes:
generating a virtual finish time for each VTRS packet; and
matching the VTRS packets to the switch outputs using the virtual finish times.

8. The method of claim 7, wherein matching the VTRS packets to the switch outputs using the virtual finish times further includes matching the VTRS packets with the smallest virtual finish times to the switch outputs.

9. The method of claim 1 wherein the amount of time to process each VTRS packet is a constant.

10. A network for transmission of packets comprising:
an edge conditioner generating a packet state corresponding to each packet traversing the network and associating the packet state with the packet to obtain a virtual time reference system (VTRS) packet, the packet state including a virtual time stamp, the virtual time stamp being an arrival time of each of the packets at the edge conditioner; and
a switch operably coupled to the edge conditioner, the switch receiving the VTRS packet and scheduling transmission of the VTRS packet by using the virtual time stamp, the switch updating the virtual time stamp by adding a virtual delay to the virtual time stamp, the virtual delay comprising an amount of time to process each VTRS packet and a propagation delay indicating a transmission time between switches in the network, the switch matching VTRS packets to switch outputs using virtual time stamps included in packet states,
wherein the virtual time stamps are updated at the switch as the VTRS packets leave the switch, and
wherein the virtual time stamps are removed from the VTRS packets at outputs of the network.

11. The network of claim 10, wherein the edge conditioner generates regulated packet traffic for a flow using a size of each of the packets and a reserved flow rate.

12. The method of claim 10 wherein updating the virtual time stamp further comprises adding an error term, the error term indicative of an upper bound of a difference between an actual departure time and a virtual finish time of the VTRS packet traversing the switch.

13. The network of claim 10, wherein the amount of time to process each VTRS packet is generated using the size of each VTRS packet, a flow rate reserved for a flow including each VTRS packet, and a virtual time adjustment term.

14. The network of claim 13, wherein the packet state further includes the reserved flow rate and the virtual time adjustment term.

15. The network of claim 10, wherein the switch matches the VTRS packets to the switch outputs by determining a virtual finish time for each VTRS packet.

16. The network of claim 15, wherein the switch matches the VTRS packets to the switch outputs using the smallest virtual finish times.

17. A method for scheduling packets in a network, the method comprising:
generating regulated packet traffic for a flow from the packets using a size of each of the packets and a reserved flow rate;
generating a packet state including a virtual time stamp for each of the packets, the virtual time stamp comprising an arrival time of each of the packets at an initial switch at which the packet enters the network, and further comprising adding a virtual delay to the virtual time stamp, the virtual delay comprising an amount of time to process each packet and a propagation delay indicating a transmission time between switches in the network;
associating packet states with the packets to obtain virtual time reference system (VTRS) packets;
generating a virtual finish time for each VTRS packet using the virtual time stamp and the virtual delay;
matching the VTRS packets with the smallest virtual finish times to switch outputs;
updating the virtual time stamp at the switch as the VTRS packet leaves the switch; and
removing the virtual time stamp from the VTRS packets at outputs of the network.

18. The method of claim 17, wherein updating the virtual time stamp at the switch includes updating the packet virtual time stamp for each VTRS packet using the virtual time stamp, the size of the VTRS packet, a flow rate reserved for a flow including the VTRS packet, and a virtual time adjustment term included in the packet state.

19. An apparatus for scheduling packets in a network, the apparatus comprising:
means for generating a packet state including a virtual time stamp for each of the packets, the virtual time stamp comprising an arrival time of each of the packets at an initial switch at which the packet enters the network and a virtual delay comprising an amount of time to process each packet and a propagation delay indicating a transmission time between switches in the network;
means for associating packet states with the packets to obtain virtual time reference system (VTRS) packets;
means for matching the VTRS packets to switch outputs using the packet states; and
means for updating the virtual time stamp at each switch as the VTRS packet leaves the switch,
wherein the switches at outputs of the network remove the virtual time stamps associated with the VTRS packets.

20. The apparatus of claim 19 further comprising means for generating regulated packet traffic for a flow using the VTRS packets.

21. The apparatus of claim 20, wherein the means for generating regulated packet traffic uses a size of each VTRS packet and a reserved flow rate to generate the regulated packet traffic.

22. The apparatus of claim 19 wherein the means for updating the packet virtual time stamp further uses an error term to update the packet virtual time stamp, the error term indicative of an upper bound of a difference between an actual departure time of a VTRS packet and a virtual finish time of the VTRS packet.

23. The apparatus of claim 19, further comprising means for generating the virtual delay using a size of each VTRS packet, a flow rate reserved for a flow including each VTRS packet, and a virtual time adjustment term.

24. The apparatus of claim 23, wherein the packet state further includes the reserved flow rate and the virtual time adjustment term.

25. The apparatus of claim 19, wherein the means for matching the VTRS packets to the switch outputs further includes:

means for generating a virtual finish time for each VTRS packet; and means for matching the VTRS packets to the switch outputs using the virtual finish times.

26. The apparatus of claim 25, wherein the means for matching the VTRS packets to the switch outputs using the virtual finish times further includes means for matching the VTRS packets with the smallest virtual finish times to the switch outputs.

* * * * *